(12) United States Patent
Yamamoto

(10) Patent No.: US 6,512,528 B1
(45) Date of Patent: Jan. 28, 2003

(54) METHOD OF DISPLAYING IMAGES WITH A TOUCHPANEL FOR A MOLDED FORM-TAKE OUT ROBOT

(75) Inventor: Koji Yamamoto, Kyoto (JP)

(73) Assignee: Yoshin Precision Equipment Co., Ltd., Kyoto (JP)

( * ) Notice: Subject to any disclaimer, the term of this patent is extended or adjusted under 35 U.S.C. 154(b) by 0 days.

(21) Appl. No.: 09/558,161

(22) Filed: Apr. 26, 2000

(30) Foreign Application Priority Data

Apr. 28, 1999 (JP) .......................................... 11-122862

(51) Int. Cl.$^7$ ................................................ G09G 5/00
(52) U.S. Cl. ........................ 345/771; 345/848; 700/200
(58) Field of Search ................................. 345/771, 848, 345/649, 650, 653, 659; 700/98, 118, 163, 197, 200

(56) References Cited

U.S. PATENT DOCUMENTS 6,338,004 B1 * 1/2002 Usui .......................... 700/200

FOREIGN PATENT DOCUMENTS

JP    08085981 A    4/1996

* cited by examiner

Primary Examiner—Ba Huynh
(74) Attorney, Agent, or Firm—Armstrong, Westerman & Hattori, LLP

(57) ABSTRACT

The invention provides a method of displaying images with a touchpanel for a molded form-take out robot wherein three-dimensional images of robot corresponding to the setting patterns of the molded form-take out robot and the set positions of the touchpanel type image-display device are shown, so that operators can perform the teaching operation without misunderstanding the orientation of the robot's images and the actual robot, thereby surely avoiding an incorrect teaching operation.

The touchpanel type images-displaying method for molded form-take out robot shows on the image-display device the three-dimensional images of the Operator-side robot corresponding to the robot setting patterns and the set positions of the image-display device.

1 Claim, 14 Drawing Sheets

METHOD OF DISPLAYING IMAGES WITH A TOUCHPANEL FOR A MOLDED FORM-TAKE OUT ROBOT

BACKGROUND OF THE INVENTION

1. Field of the Invention

The present invention relates to a method of displaying images with a touchpanel for a molded form-take out robot.

2. Description of the Prior Art

A molded form-take out robot does, as shown in FIG. 11, comprise a first movement means 5, which is provided with a transverse beam 3 mounted and fixed at its root portion 1 directly onto a stationary platen 2A of an injection molding machine 2 and extending at a free end of the transverse beam 3 at a lateral side of the injection molding machine 2 as intersecting with a longitudinal axis C thereof, and also provided with, for example, a servo-motor 3A mounted on the transverse beam 3; a second movement means 7, which is provided with a drawing beam 6 (mounted on the transverse beam 3 with a root portion 4 being assembled on the same, extending along the longitudinal axis C of the injection molding machine 2, and movable, by actuation of the servo-motor 3A on the transverse beam 3, forwards and backwards in the extent from the root portion 1 to the free end of the same in the direction (indicated by the arrow X) intersecting the longitudinal axis C), and also provided with, for example, servo-motors 6A, 6B mounted on the drawing beam 6 (the servo-motors 6A, 6B are accommodated in a servo-motor accommodation box and thus not shown); a pair of grasping means 8A, 8B movable, by actuation of the servo-motors 6A, 6B, forwards and backwards in the extent from the root portion 4 to the free end of the drawing beam 6 in the direction (indicated by the arrow Y) of the longitudinal axis C of the injection molding machine 2; and a raise-lower means 9A, 9B raising and lowering the grasping means 8A, 8B. The molded form-take out robot is subjected, before the start of automatic continuous operation, to such teaching operation with an image-display device 10 using a touchpanel that an operator performs an inputting operation (described later) to cause a liquid crystal panel 10A of the image-display device 10 to show an image of the molded form-take out robot, so that the operator does, while watching the shown image of the molded form-take out robot, set and input proper or suitable values for the amounts of strokes of the first movement means 5, of the second movement means 7 and of the raise and lower means 9A and 9B.

The molded form-take out robot may be arranged with respect to the injection molding machine 2 in such separate patterns that the transverse beam 3 extends, as shown in FIG. 12, from a position on the injection molding machine 2 (where an injection part 2B mounted at the longitudinal rear side of the stationary platen 2A (see FIG. 11) is seen on the right-hand side) to a first lateral side of the machine 2 shown in FIG. 12, thereby causing the free end of the beam 3 to project outwards of the machine 2 ("Operator-side extension pattern 12"), or that the transverse beam 3 extends, as seen in FIG. 13, from the same position on the injection molding machine 2 (as above) to a second lateral side of the machine 2 shown in FIG. 13, with the free end of the beam 3 projecting outwards of the machine 2 oppositely to the first lateral side ("Opposite-side extension pattern 13").

According to a conventional images-displaying method using a touchpanel, the liquid crystal panel 10A of the image-display device 10 shows a three-dimensional image 23 of the take-out robot in the Operator-side extension pattern in which the transverse beam 3 extends in the first lateral side ("Operator side") as seen in FIG. 7. Even with the conventional images-displaying method in which only the Operator-side robot image 23 can be shown on the liquid crystal panel 10A, in case that the molded form-take out robot is arranged in the Operator-side extension pattern 12 (FIG. 12) and the image-display device 10 is positioned at the Operator-side (i.e., at the first lateral side of the injection molding machine 2 with respect to the point thereon viewing the injection part 2B on the right-hand side), and when the operator does, while watching the three-dimensional image 23 of the Operator-side take out robot shown on the liquid crystal panel 10A, perform the foregoing "teaching" operation, the take out robot (set in the Operator-side extension pattern 12) and the three-dimensional image 23 (of the Operator-side take out robot shown on the liquid crystal panel 10A) correspond in orientation to each other, thereby enabling the operator O to be prevented from misunderstanding the orientation, and also enabling avoiding an erroneous or incorrect teaching operation.

However, in case that the molded form-take out robot is set in the Opposite-side extension pattern 13 as shown in FIG. 13 and the image-display device 10 using a touchpanel is still positioned at the Operator-side, when the operator O does, while watching the three-dimensional image 23 of the Operator-side take out robot shown on the liquid crystal panel 10A, perform the foregoing teaching operation, the take out robot (set in the Opposite-side extension pattern 13) and the three-dimensional image 23 (of the Operator-side take out robot shown on the liquid crystal panel 10A) are so different to each other in the orientation that the transverse beams 3 extend reversely to each other), whereby operators' misunderstanding of the orientation is very likely to happen, resulting in an incorrect teaching operation.

Moreover, in case that the molded form-take out robot is set in the Opposite-side extension pattern 13 as shown in FIG. 14 and the touchpanel type image-display device 10 is also positioned at the Opposite-side (i.e., in the second lateral side of the injection molding machine 2 with respect to the point thereon viewing the injection part 2B on the right-hand side), when the operator O does, while watching the three dimensional image 23 of the "Operator-side" take out robot shown on the liquid crystal panel 10A, perform the foregoing teaching operation, the take out robot (set in the Opposite-side extension pattern 13) and the three-dimensional image 23 (of the "Operator-side" take out robot shown on the liquid crystal panel 10A) differ from each other in the orientation as that the drawing beams 6 extend reversely to each other, whereby operators' misunderstanding the orientation is very likely to happen, resulting in an incorrect teaching operation.

In detail, the conventional images-displaying method using a touchpanel for the molded form-take out robot has no problems in the teaching operation by the operator watching the three-dimensional image of the Operator-side take out robot shown on the liquid crystal panel of the touchpanel type image-display device positioned at the Operator-side with the molded form-take out robot being arranged in the operator-side extension pattern. However, the conventional method has a problem or fear of operators' misunderstanding the orientation and a resultant incorrect teaching operation due to difference in the orientation between the take out robot set in the Opposite-side extension pattern and the three dimensional image of the "Operator-side" take out robot shown on the liquid crystal panel when the operator does, while watching the three dimensional image of the "Operator-side" take out robot shown on the liquid crystal panel, perform the teaching operation in case that the molded form-take out robot is set in the Opposite-side extension pattern, and the touchpanel type image-display device is positioned at the Operator-side or at the Opposite-side.

SUMMARY OF THE INVENTION

The present invention has been designed under the above circumstances.

An object of the present invention is to provide a method of displaying images with a touchpanel for a molded form-take out robot wherein three-dimensional images of robot corresponding to the setting patterns of the molded form-take out robot and the set positions of the touchpanel type image-display device are shown, so that operators can perform the teaching operation without misunderstanding the orientation of the robot's images and the actual robot, thereby surely avoiding an incorrect teaching operation.

The object of the present invention has been achieved by a method of displaying images with a touchpanel for a molded form-take out robot comprising a first movement means mounted and fixed at a root portion directly to an injection molding machine and moving forwards and backwards at least one grasping means in the widthwise direction of the injection molding machine intersecting the longitudinal direction thereof, and a second movement means moving forwards and backwards said at least one grasping means in the longitudinal direction of the injection molding machine, wherein there is provided a controller comprising a central processing unit, ROM having software programs, RAM storing data, and an input/output device provided with a touchpanel type image-display device and a sheet switch shown on the image-display device, so that in any of such three situations as a first situation in which the molded form-take out robot is set in an Operator-side extension pattern with the image-display device being positioned at the Operator-side; a second situation in which the robot is set in an Opposite-side extension pattern with the image-display device at the Operator-side; and a third situation in which the robot is set in the Opposite-side extension pattern with the image-display device at the Opposite-side, inputting operation by an operator and controlling by the controller according to the operator's inputting operation provide that: upon the start of operation, the image-display device shows a main image having a sheet switch for selecting a menu image; the menu image selecting sheet switch when set "ON" causes the image-display device to show a menu image having a sheet switch for selecting a function-selection image; the sheet switch for selecting the function-selection image when set ON causes the image-display device to show a first function-selecting image having a sheet switch for selecting specific directions of taking molded forms; and the sheet switch for selecting specific directions of taking molded forms when set ON causes the image-display device to show a second function-selecting image having a first Operator-side sheet switch and a first Opposite-side sheet switch separately, wherein in said first situation the Operator-side sheet switch on the second function-selecting image when set ON causes the image-display device to show a three-dimensional image of a molded form-take out robot set in the Operator-side in which the first movement means extends at its free end to the Operator-side of the injection molding machine; in said second situation and at the time that the second function-selecting image is shown, the Opposite-side sheet switch on the second function-selecting image when set ON causes the image-display device to show a third function-selecting image having a second Operator-side sheet switch and a second Opposite-side sheet switch separately, so that the second Operator-side sheet switch on the third function-selecting image when set ON causes the image-display device to show a three-dimensional image of the molded form-take out robot set in the Opposite-side in which the first movement means extends at its free end to the Opposite-side of the injection molding machine; or in said third situation and at the time that the third function-selecting image is shown, the second Opposite-side sheet switch on the third function-selecting image when set ON causes the image-display device to show a three-dimensional image of the molded form-take out robot set in the Opposite-side in which the first movement means extends at its free end to the Opposite-side of the injection molding machine.

According to the method of displaying images with a touchpanel for molded form-take out robot, three-dimensional images of the molded form-take out robot precisely corresponding to the specific setting patterns of the robot and the setting positions of the touchpanel type image-display device can be shown or displayed. Thus, before start of the robot's automatic continuous operation, when the teaching operation for setting and inputting proper values for strokes of the first and the second movement means is performed, operators can be prevented from misunderstanding the orientation of the robot, thereby surely avoiding an incorrect teaching operation.

DETAILED DESCRIPTION OF THE PREFERRED EMBODIMENT

Figure 1:
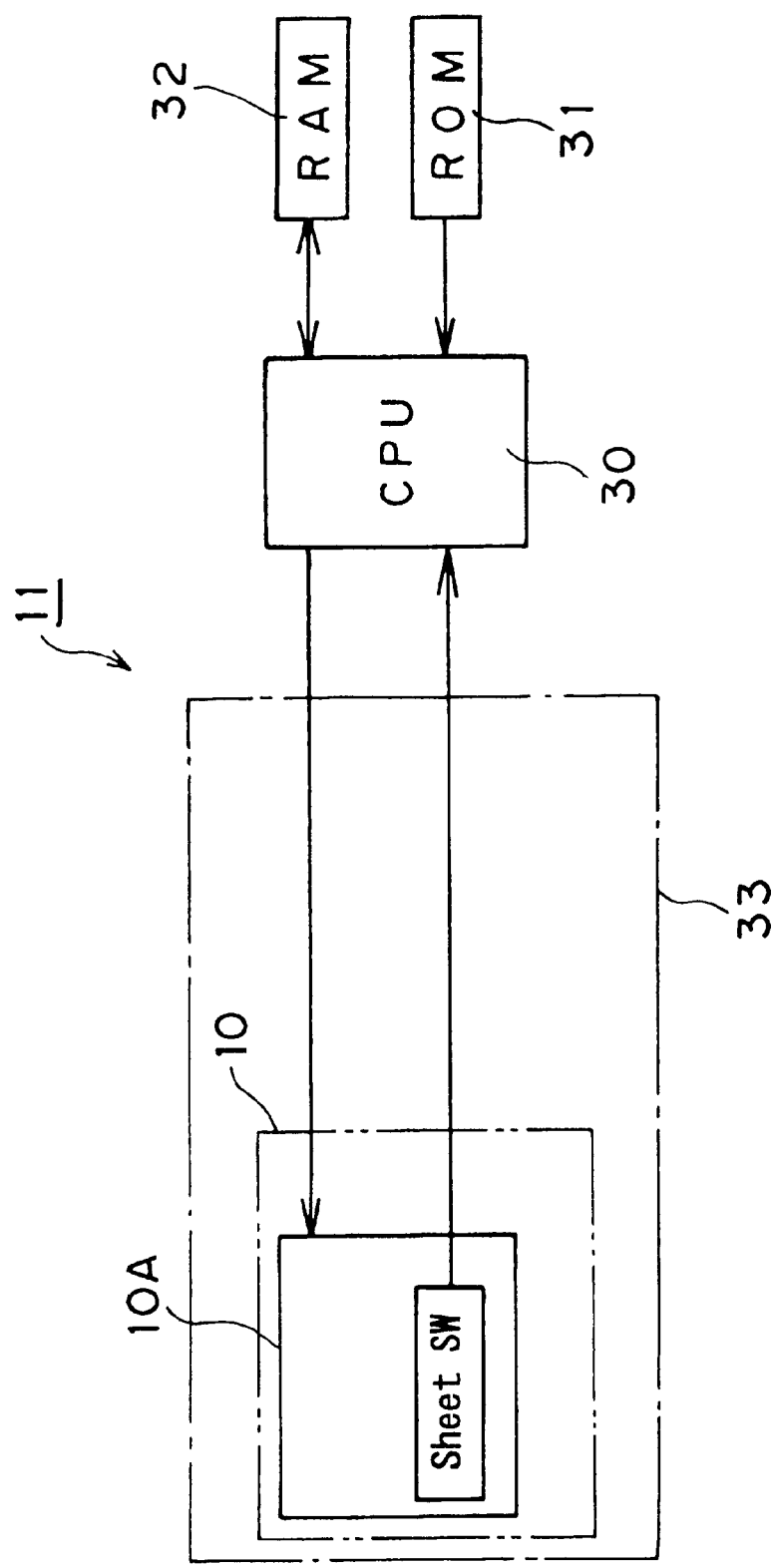
FIG. 1 is a block diagram of an example of the present invention.

FIG. 1 shows an example of the present invention in a block diagram. A controller 11 which makes controlling for using the present invention comprises a central processing unit (CPU) 30, a ROM 31 in which a software program is set, a RAM 32 storing data, and an input/output device 33 comprising an image-display device 10 using a touchpanel and a sheet switch shown as an image on a liquid crystal panel 10A of the image-display device 10.

The central processing unit 30 controls the input/output device 33 in accordance with the software program previously set in ROM 31. In detail, CPU 30 processes signals on the basis of switch signals, which are outputted by setting "ON" (called "touching" hereunder) the sheet switch shown on the liquid crystal panel 10A, and data stored in RAM 32, emits signals to the liquid crystal panel 10A to show thereon a predetermined image.

Figure 2:
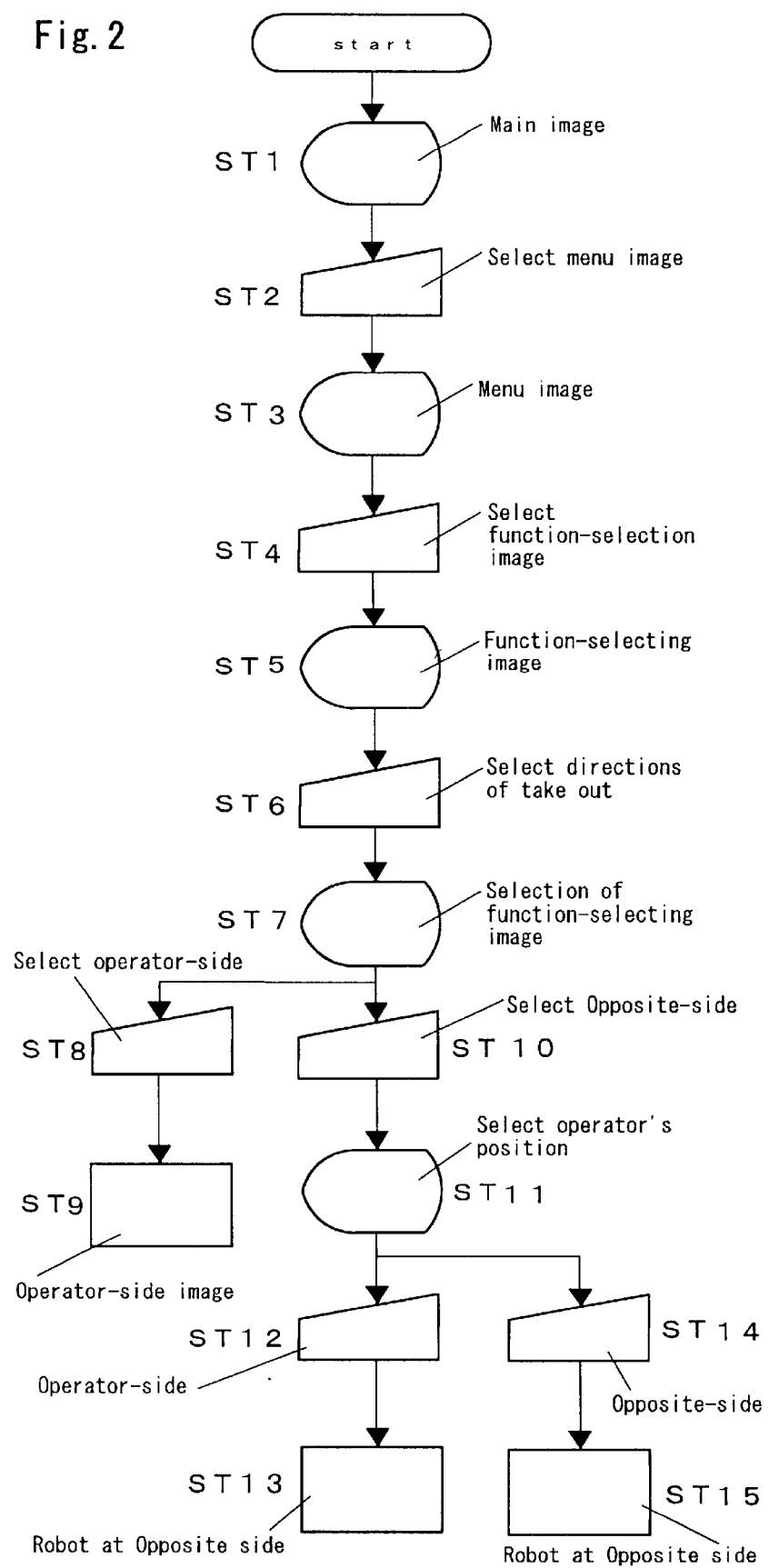
FIG. 2 is a flow chart showing an operational procedure of an example of the present invention.
Figure 3:
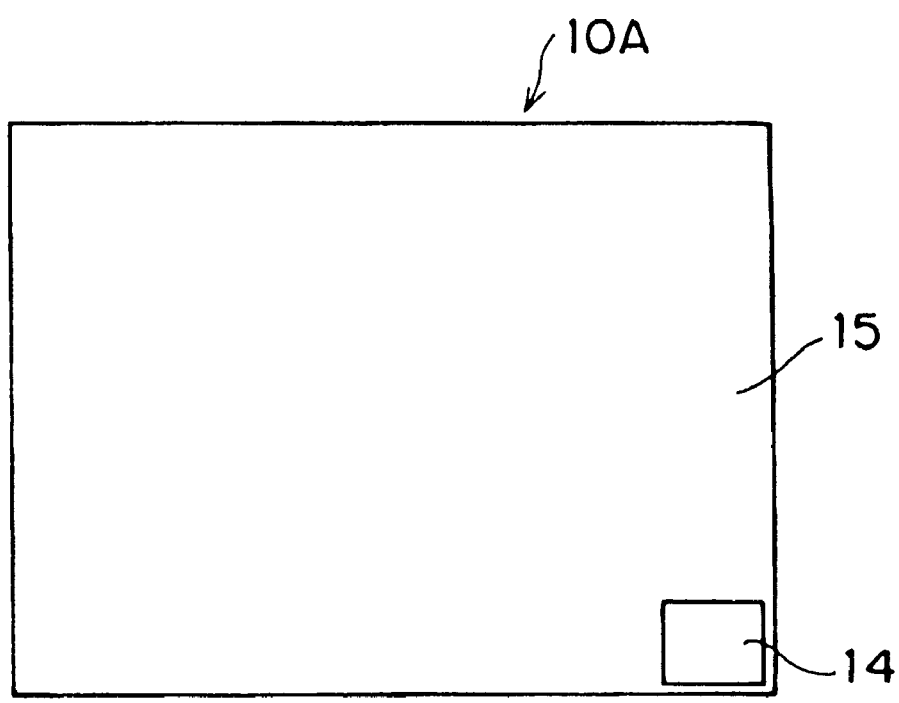
FIG. 3 is a front view showing an example of the main image.
Figure 4:
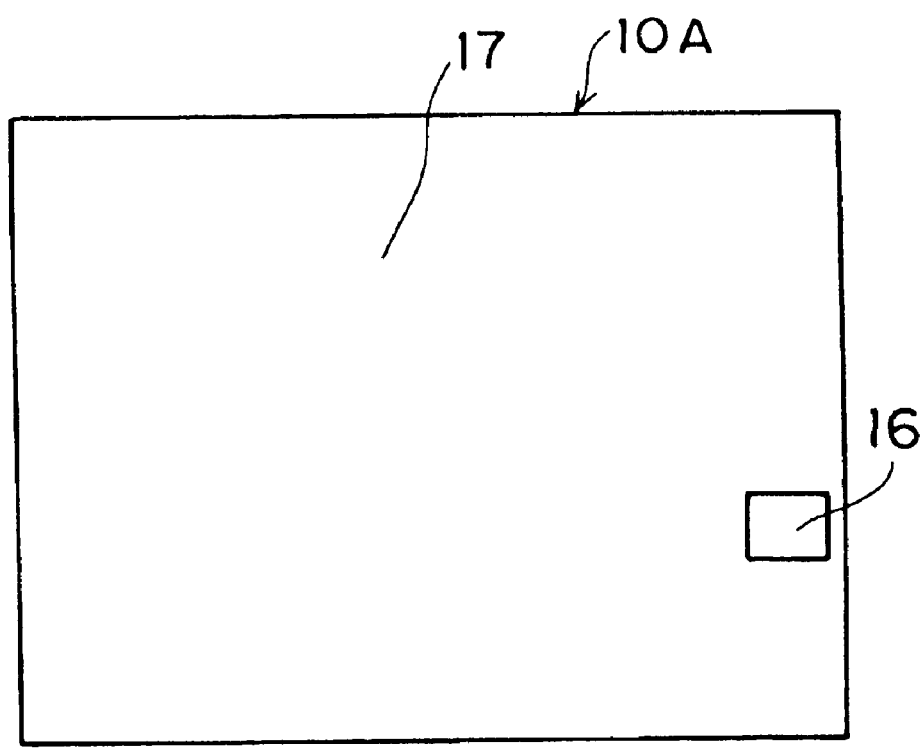
FIG. 4 is a front view showing an example of the menu image.
Figure 12:
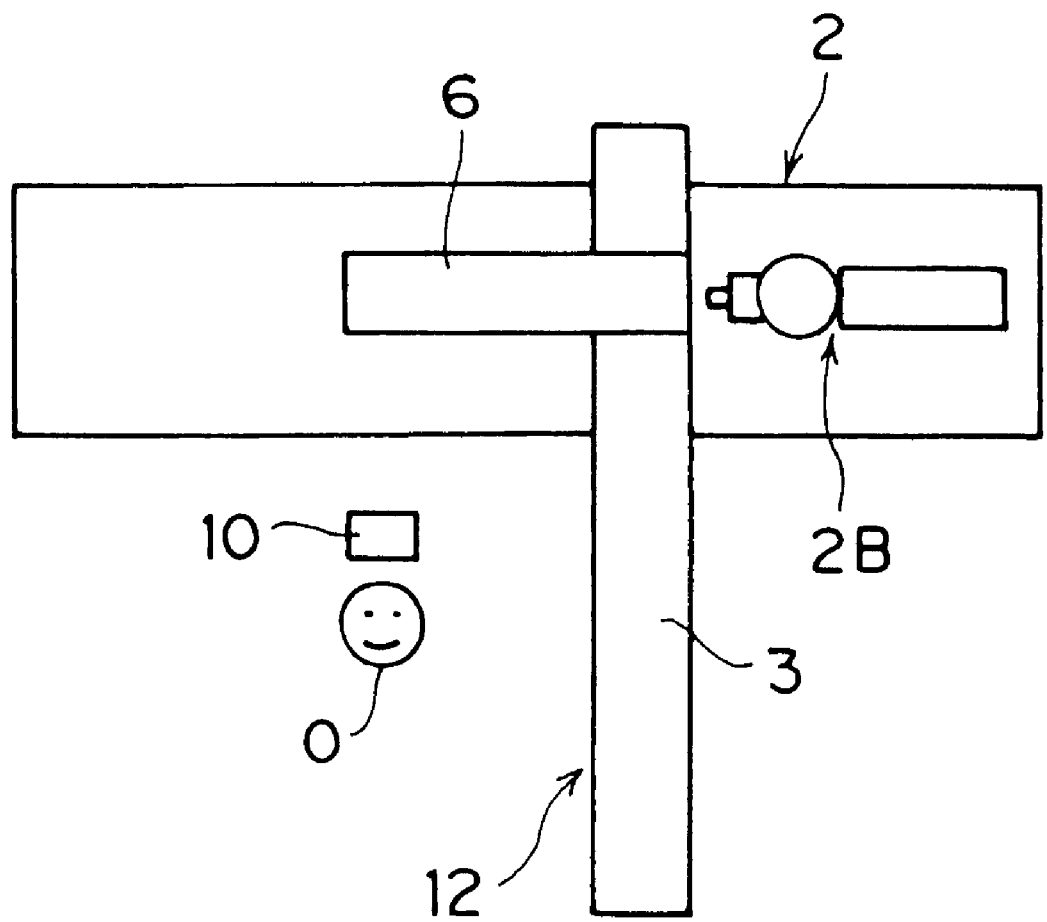
FIG. 12 is a schematic plan view showing a positional correlation among the injection molding machine, the Operator-side take out robot, and touchpanel type image-display device.

In a first situation wherein the molded form-take out robot is set in the Operator-side extension pattern 12 and the touchpanel type image-display device 10 is positioned at the Operator-side as seen in FIG. 12, the liquid crystal panel 10A of the image-display device 10 does, following start of operation in FIG. 2, show a main image 15 having a sheet switch 14 for selecting a menu image as seen in FIG. 3 (Step 1 in FIG. 2). Touching the sheet switch 14 (Step 2) causes the liquid crystal panel 10A to show a menu image 17 having a sheet switch 16 for selecting a function-selection image as seen in FIG. 4 (Step 3).

Figure 5:
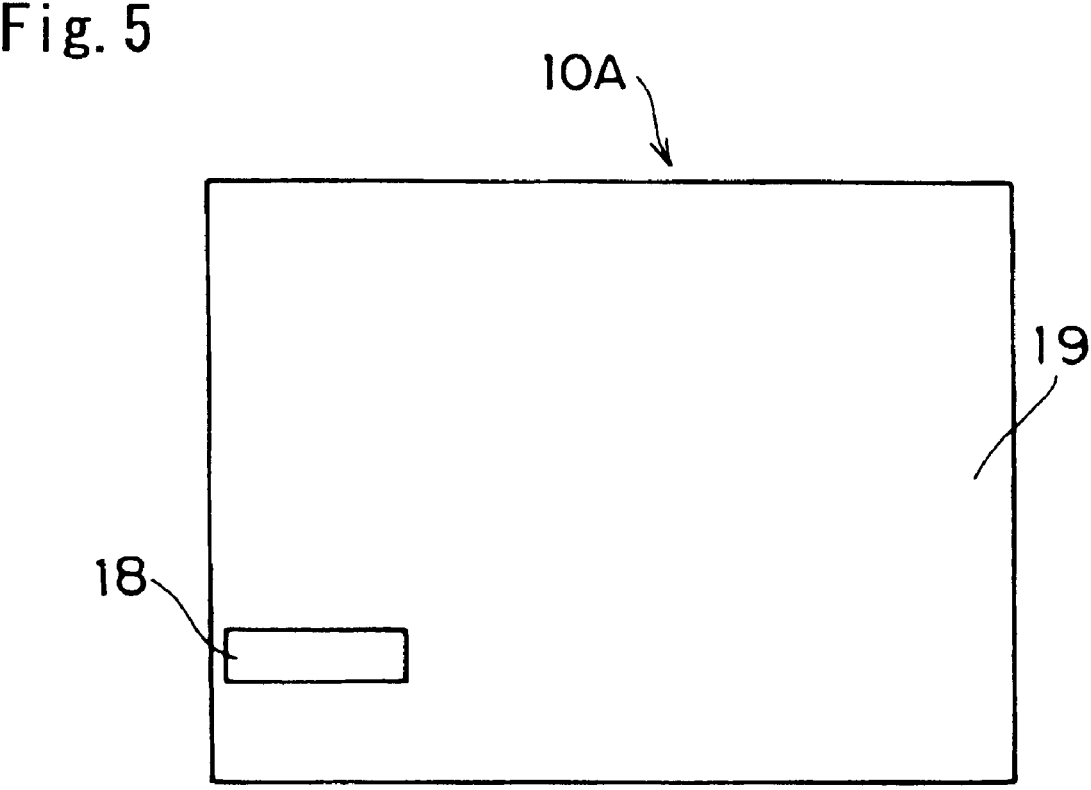
FIG. 5 is a front view showing an example of the first function-selecting image.

Touching the sheet switch 16 (Step 4) causes the liquid crystal panel 10A to show a first function-selecting image 19 having a sheet switch 18 for selecting specific directions of taking molded forms as seen in FIG. 5 (Step 5).

Figure 6:
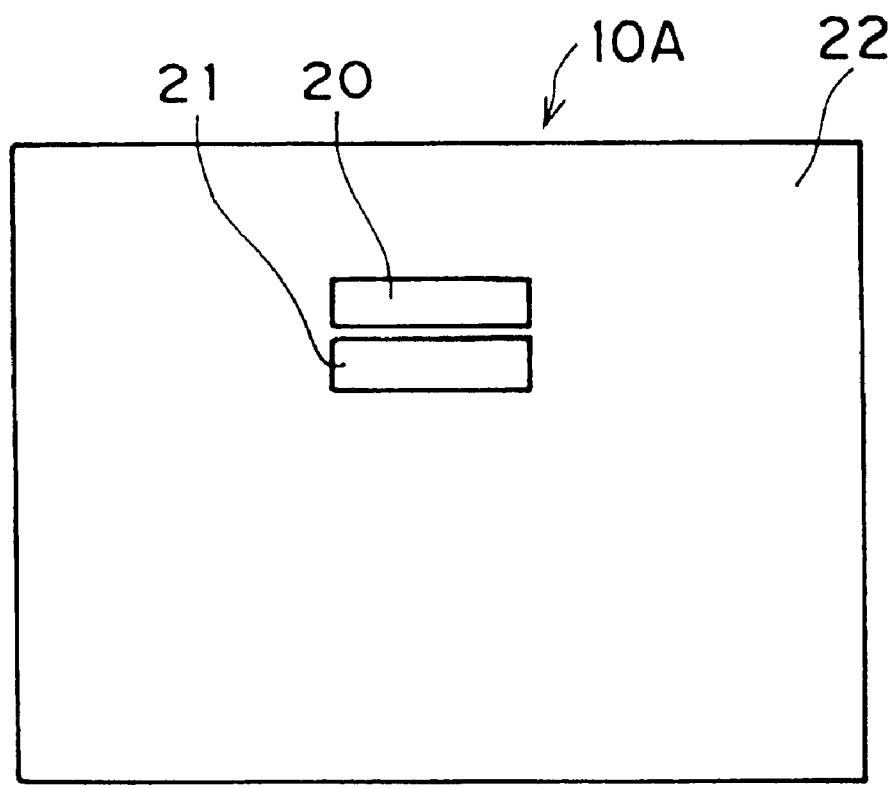
FIG. 6 is a front view showing an example of the second function-selecting image.

Touching the sheet switch 18 (Step 6) causes the liquid crystal panel 10A to show a second function-selecting image 22 having an Operator-side sheet switch 20 and an Opposite-side sheet switch 21 separately as seen in FIG. 6 (Step 7).

Figure 7:
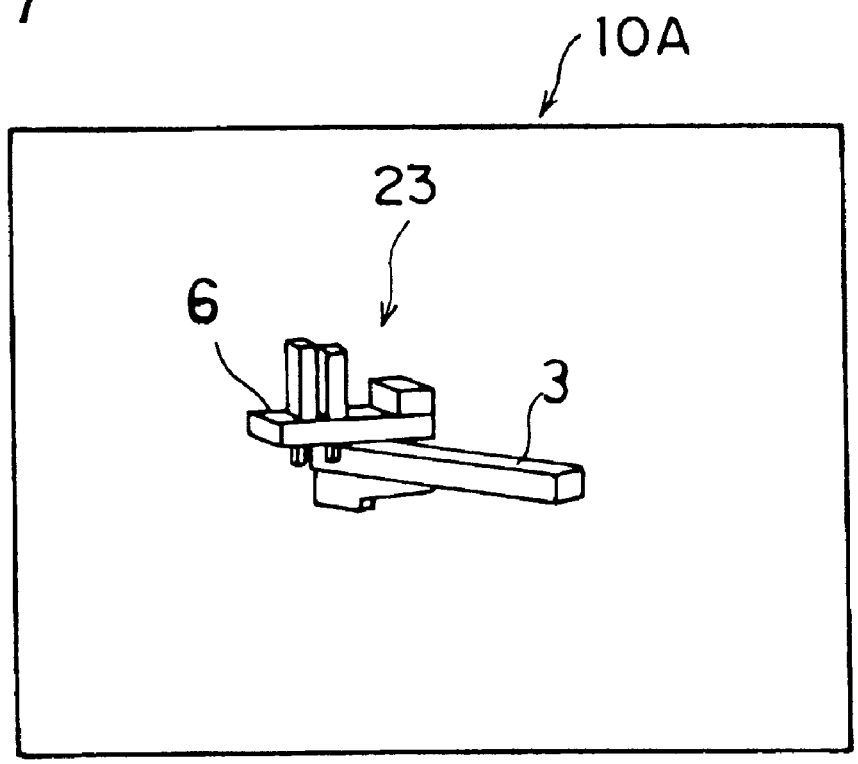
FIG. 7 is a front view showing an example of a three-dimensional image of the Operator-side take out robot.

Touching the Operator-side sheet switch 20 (Step 8) causes the liquid crystal panel 10A to show a three-dimensional image 23 of a molded-form take out robot set in the Operator-side in which the transverse beam 3 of the robot extends to the foregoing first lateral side of the injection molding machine (the Operator-side) as seen in FIG. 7 (Step 9).

Figure 13:
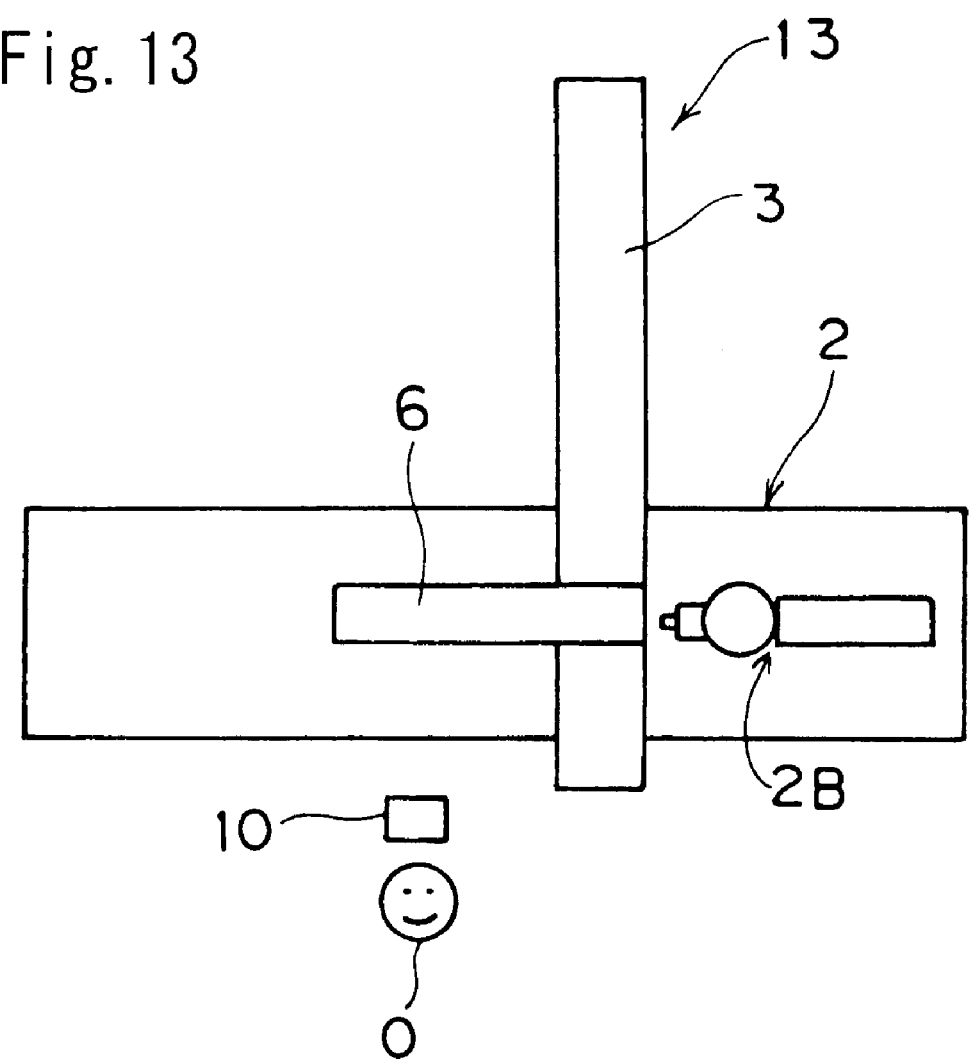
FIG. 13 is a schematic plan view showing a positional correlation among the injection molding machine, the Opposite-side take out robot, and touchpanel type image-display device.

In a second situation wherein the molded form-take out robot is set in the Opposite-side extension pattern 13 and the touchpanel type image-display device 10 is positioned at the Operator-side as seen in FIG. 13, the liquid crystal panel 10A of the image-display device 10 does, following start of operation in FIG. 2, show a main image 15 having a sheet switch 14 for selecting a menu image as seen in FIG. 3 (Step 1 in FIG. 2). Touching the sheet switch 14 (Step 2) causes the liquid crystal panel 10A to show a menu image 17 having a sheet switch 16 for selecting a function-selection image as seen in FIG. 4 (Step 3).

Touching the sheet switch 16 (Step 4) causes the liquid crystal panel 10A to show a first function-selecting image 19 having a sheet switch 18 for selecting specific directions of taking molded forms as seen in FIG. 5 (Step 5).

Touching the sheet switch 18 (Step 6) causes the liquid crystal panel 10A to show a second function-selecting image 22 having an Operator-side sheet switch 20 and an Opposite-side sheet switch 21 separately as seen in FIG. 6 (Step 7).

Figure 8:
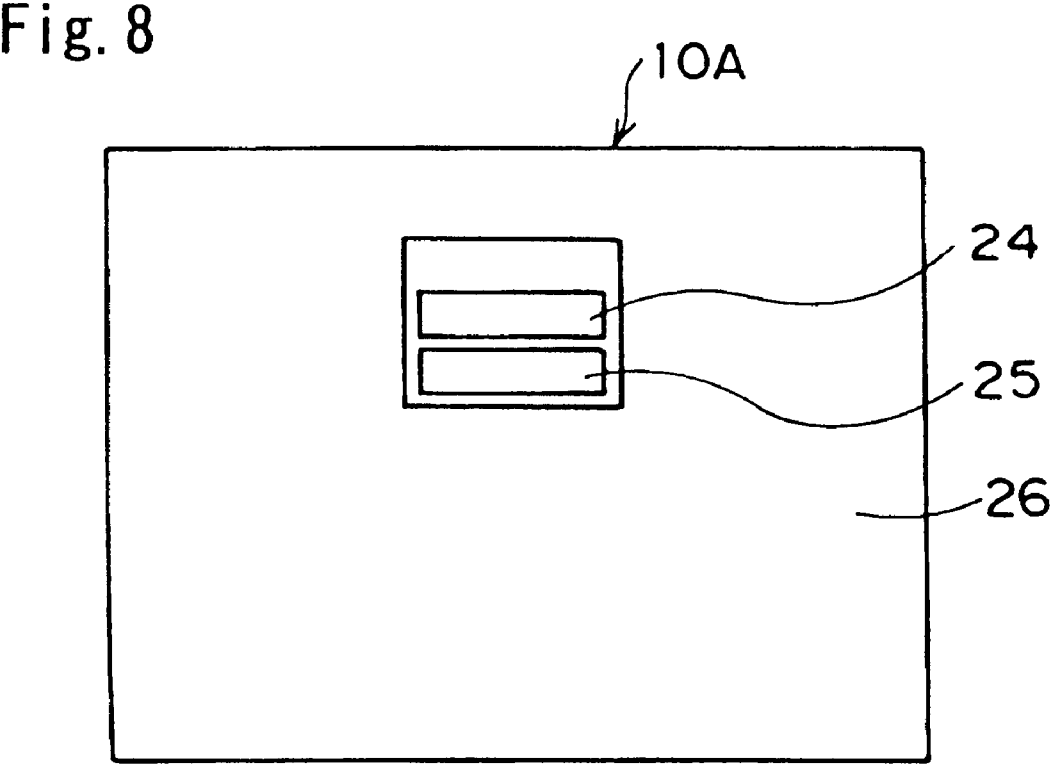
FIG. 8 is a front view showing an example of the third function-selecting image.

Touching the Opposite-side sheet switch 21 (Step 10) causes the liquid crystal panel 10A to show a third function-selecting image 26 having an Operator-side sheet switch 24 and an Opposite-side sheet switch 25 separately as seen in FIG. 8 (Step 11).

Figure 9:
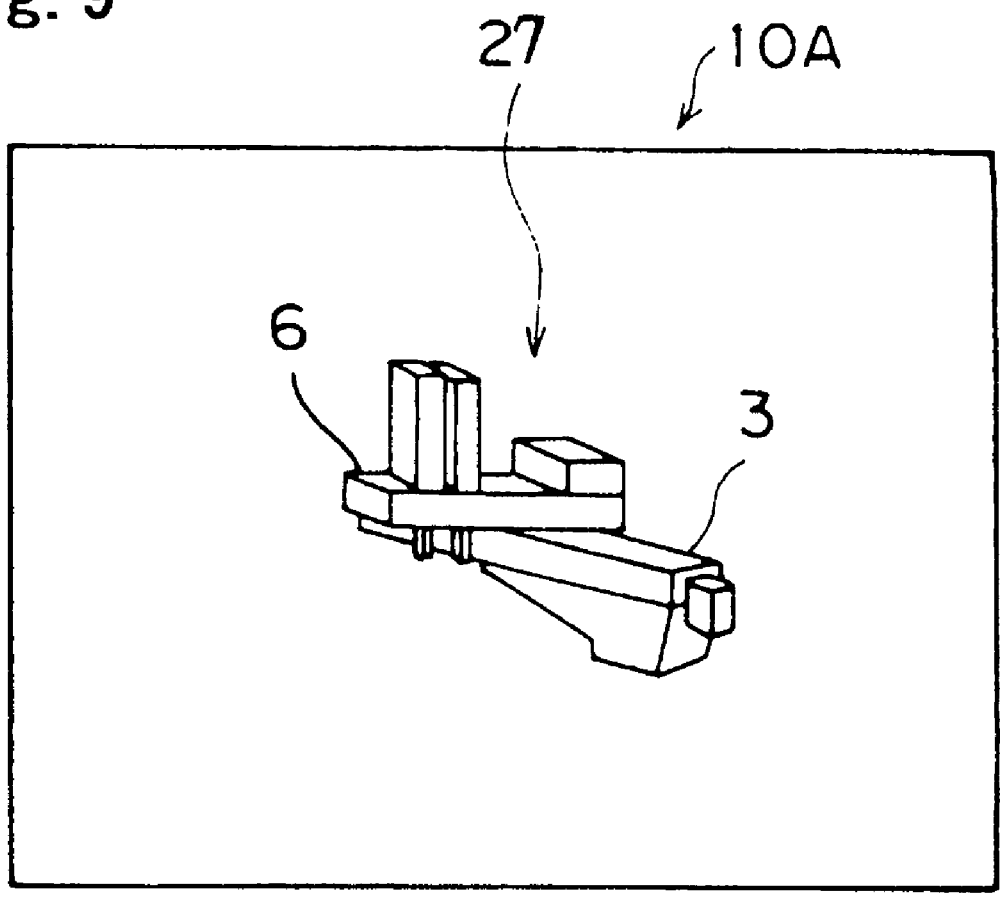
FIG. 9 is a front view showing an example of a three-dimensional image of the Opposite-side take out robot.

Touching the Operator-side sheet switch 24 (Step 12) causes the liquid crystal panel 10A to show a three-dimensional image 27 of a molded-form take out robot set in the Opposite-side in which the transverse beam 3 of the robot extends reversely, i.e., to the foregoing second lateral side of the injection molding machine (the Opposite-side) as seen in FIG. 9 (Step 13).

Figure 14:
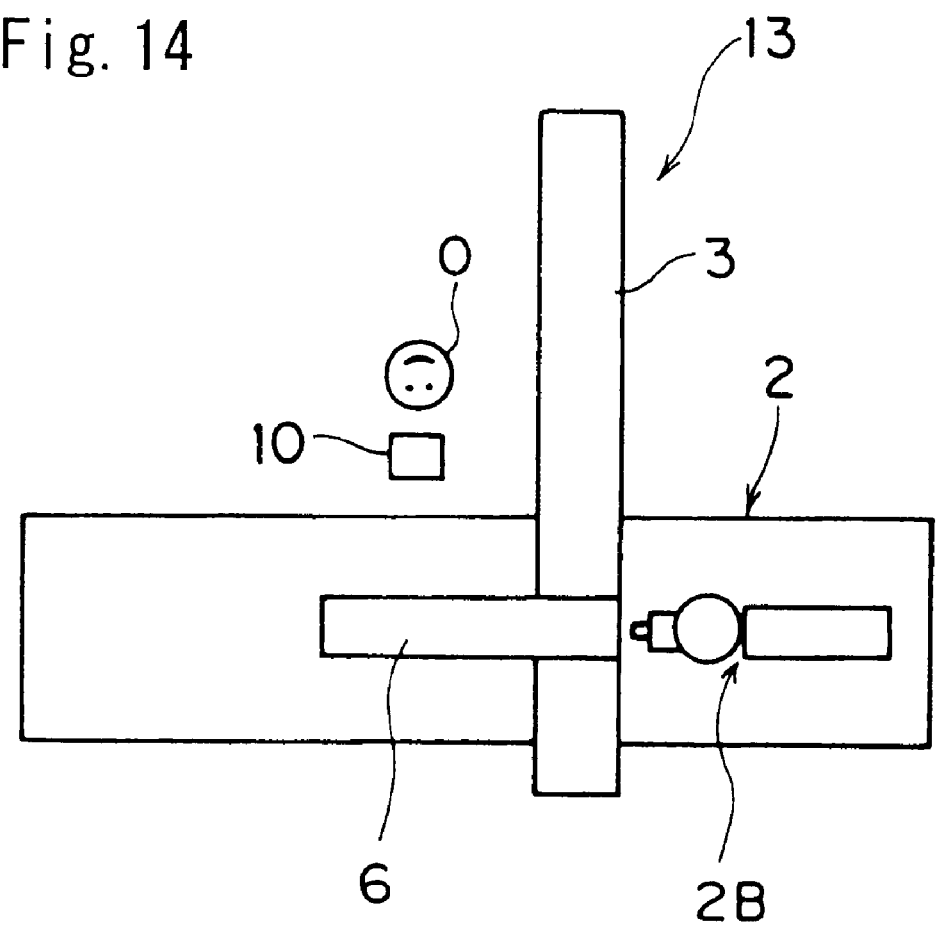
FIG. 14 is a schematic plan view showing a positional correlation among the injection molding machine, the Opposite-side take out robot, and touchpanel type image-display device.

Moreover, in a third situation wherein the molded form-take out robot is set in the Opposite-side extension pattern 13 and the touchpanel type image-display device 10 is positioned at the Opposite-side as seen in FIG. 14, the liquid crystal panel 10A of the image-display device 10 does, following start of operation in FIG. 2, show a main image 15 having a sheet switch 14 for selecting a menu image as seen in FIG. 3 (Step 1 in FIG. 2). Touching the sheet switch 14 (Step 2) causes the liquid crystal panel 10A to show a menu image 17 having a sheet switch 16 for selecting a function-selection image as seen in FIG. 4 (Step 3).

Touching the sheet switch 16 (Step 4) causes the liquid crystal panel 10A to show a first function-selecting image 19 having a sheet switch 18 for selecting specific directions of taking molded forms as seen in FIG. 5 (Step 5).

Touching the sheet switch 18 (Step 6) causes the liquid crystal panel 10A to show a second function-selecting image 22 having an Operator-side sheet switch 20 and an Opposite-side sheet switch 21 separately as seen in FIG. 6 (Step 7).

Touching the Opposite-side sheet switch 21 (Step 10) causes the liquid crystal panel 10A to show a third function-selecting image 26 having an Operator-side sheet switch 24 and an Opposite-side sheet switch 25 separately as seen in FIG. 8 (Step 11).

Figure 10:
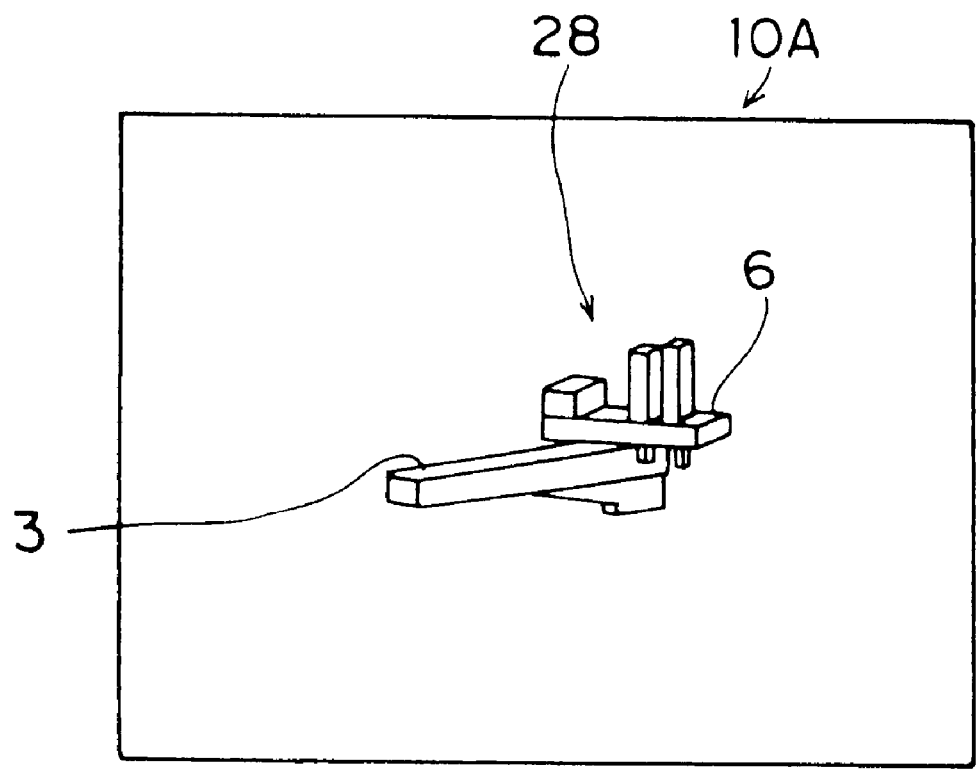
FIG. 10 is a front view showing another example of a three-dimensional image of the Opposite-side take out robot.

Touching the Opposite-side sheet switch 26 (Step 14) causes the liquid crystal panel 10A to show a three-dimensional image 28 of a molded-form take out robot set in the Opposite-side in which the transverse beam 3 of the robot extends reversely, i.e., to the foregoing second lateral side of the injection molding machine (the Opposite-side) as seen in FIG. 10 (Step 15).

As seen, in the first situation that the molded form-take out robot is set in the Operator-side extension pattern 12 as in FIG. 12 and the touchpanel type image-display device 10 is positioned at the Operator-side, the liquid crystal panel 10A shows the three-dimensional image 23 of Operator-side robot. In the second situation that the robot is set in the Opposite-side extension pattern 13 as seen in FIG. 13 with the image-display device 10 being positioned at the Operator-side, the panel 10A shows the three-dimensional image 27 of Opposite-side robot. And in the third situation that the robot is set in the Opposite-side extension pattern 13 as seen in FIG. 14 with the image-display device 10 positioned at the Opposite-side, the three-dimensional image 28 of Opposite-side robot can be shown on the liquid crystal panel 10A. Hence, upon the teaching operation to set and input proper values for strokes of the first and second movement means 5, 7 and of the raise/lower means 9A, 9B before starting the robot's automatic continuous operation, operators' misunderstanding the structural orientation can be prevented, thereby surely avoiding incorrect teaching operation.

Figure 11:
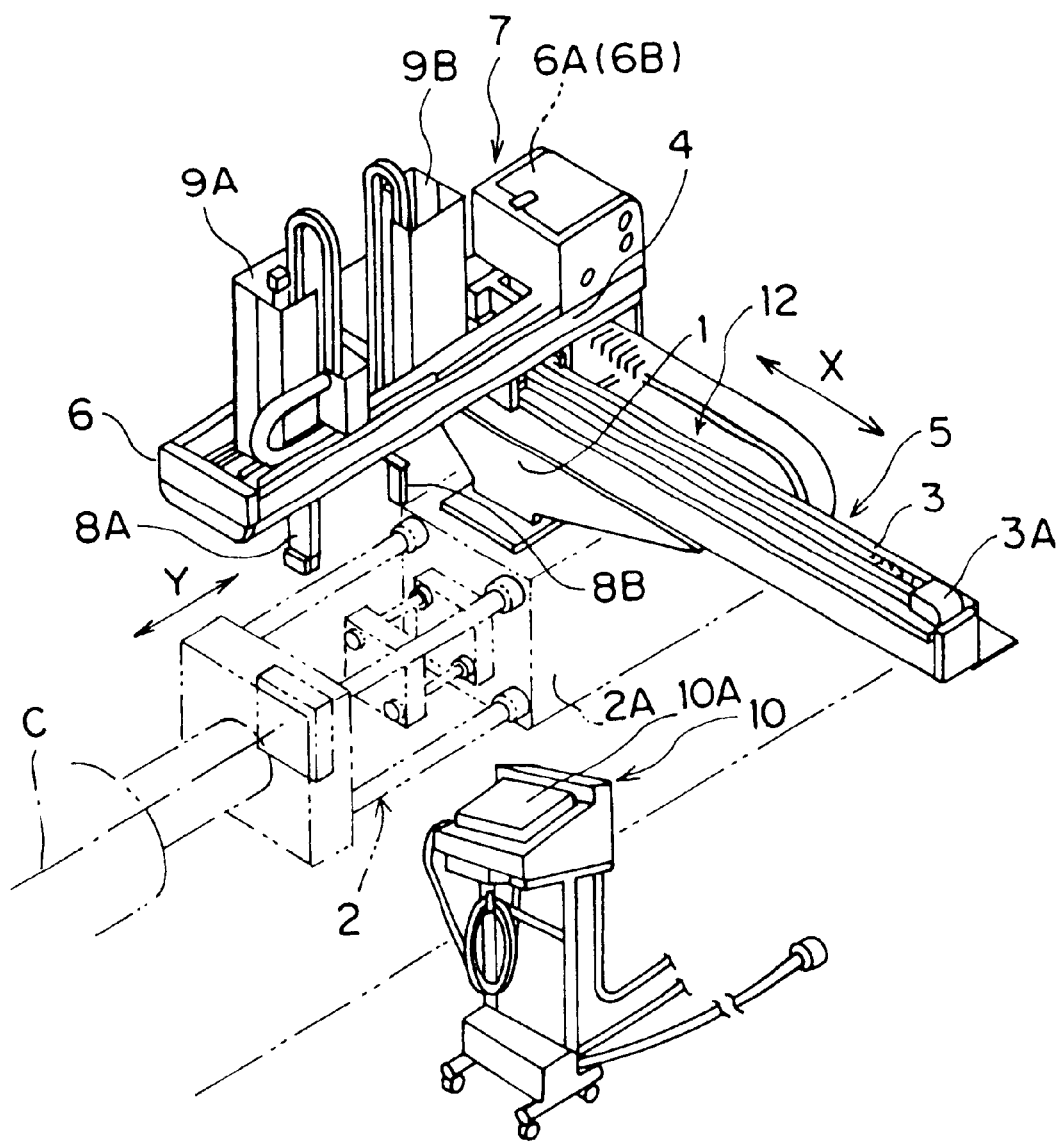
FIG. 11 is a perspective view showing a positional correlation among the injection molding machine, molded form-take out robot and touchpanel type image-display device.

The above example has been explained with referring to the molded form-take out robot shown in FIG. 11, i.e., a traverse type robot which comprises: a first movement means 5 provided with a transverse beam 3 mounted fixed at a root portion 1 directly to a stationary platen 2A of an injection molding machine 2 and extending at a free end laterally outwards of the molding machine as intersecting with a longitudinal axis C thereof, and also provided with a servo-motor 3A mounted on the transverse beam 3; a second movement means 7 provided with a drawing beam 6 mounted on the transverse beam 3 with a root portion 4 being assembled thereto, extending along the longitudinal axis C of the molding machine 2 and movable forwards and backwards in the extent from the root portion 1 to the free end of the beam 3 in the direction (indicated by X) intersecting the longitudinal axis C by actuation of the servo-motor 3A, and also provided with a servo-motor 6A, 6B mounted on the drawing beam 6; a pair of grasping means 8A, 8B movable forwards and backwards in the extent from the root portion 4 to the free end of the drawing beam 6 in the direction (Y) along the longitudinal axis C of the molding machine 2 by actuation of the servo-motor 6A, 6B; and a raise/lower means 9A, 9B for raising and lowering the grasping means 8A, 8B. The robot for taking out the molded forms used in the present invention is not limited to the traverse type robot and may employ a side-entry type of molded form-take out robot which comprises: a plurality of arms having joints and provided at ends with a grasping means; a first movement means for stretching and contracting the plurality of arms to move forwards and backwards the grasping means between a lateral position of an injection molding machine 2 and a position for taking out molded forms; a second movement means for moving forwards and approaching the plurality of arms and grasping means, which are at the molded forms-taking out position, to a position for grasping molded forms to grasp there the molded forms, then causing the arms and grasping means to move back to the molded forms-taking out position.

What we claimed is:

1. A method of displaying images with a touchpanel for a molded form-take out robot comprising a first movement means mounted and fixed at a root portion directly to an injection molding machine and moving forwards and backwards at least one grasping means in the widthwise direction of the injection molding machine intersecting the longitudinal direction thereof, and a second movement means moving forwards and backwards said at least one grasping means in the longitudinal direction of the injection molding machine, wherein there is provided a controller comprising a central processing unit, ROM having software programs, RAM storing data, and an input/output device provided with a touchpanel type image-display device and a sheet switch shown on the image-display device, so that in any of such three situations as a first situation in which the molded form-take out robot is set in an Operator-side extension pattern with the image-display device being positioned at the Operator-side; a second situation in which the robot is set in an Opposite-side extension pattern with the image-display device at the Operator-side; and a third situation in which the robot is set in the Opposite-side extension pattern with the image-display device at the Opposite-side, inputting operation by an operator and controlling by the controller according to the operator's inputting operation provide that: upon starting the operation, the image-display device shows a main image having a sheet switch for selecting a menu image; the menu image selecting sheet switch when set "ON" causes the image-display device to show a menu image having a sheet switch for selecting a function-selection image; the sheet switch for selecting the function-selection image when set ON causes the image-display device to show a first function-selecting image having a sheet switch for selecting specific directions of taking molded forms; and the sheet switch for selecting specific directions of taking molded forms when set ON causes the image-display device to show a second function-selecting image having an Operator-side sheet switch and an Opposite-side sheet switch separately, wherein in said first situation the Operator-side sheet switch on the second function-selecting image when set ON causes the image-display device to show a three-dimensional image of a molded form-take out robot set in the Operator-side in which the first movement means extends at its free end to the Operator-side of the injection molding machine; in said second situation and at the time that the second function-selecting image is shown, the Opposite-side sheet switch on the second function-selecting image when set ON causes the image-display device to show a third function-selecting image having a second Operator-side sheet switch and a second Opposite-side sheet switch separately, so that the second Operator-side sheet switch on the third function-selecting image when set ON causes the image-display device to show a three-dimensional image of the molded form-take out robot set in the Opposite-side in which the first movement means extends at its free end to the Opposite-side of the injection molding machine; or in said third situation and at the time that the third function-selecting image is shown, the second Opposite-side sheet switch on the third function-selecting image when set ON caused the image-display device to show a three-dimensional image of the molded form-take out robot set in the Opposite-side in which the first movement means extends at its free end to the Opposite-side of the injection molding machine.

* * * * *